United States Patent Office 3,164,592
Patented Jan. 5, 1965

---

3,164,592
ANTHRAQUINONE VAT DYESTUFFS OF THE
PHTHALOYLACRIDONE SERIES
Eduard Moergeli, Muttenz, Switzerland, assignor to Ciba Limited, Basel, Switzerland, a company of Switzerland
No Drawing. Filed Dec. 26, 1962, Ser. No. 247,294
Claims priority, application Switzerland, Jan. 5, 1962,
119/62
4 Claims. (Cl. 260—249)

The present invention provides valuable blue anthraquinone vat dyestuffs of the formula (1)
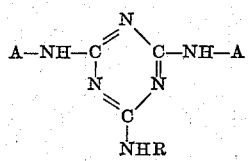

in which A— represents a 3:4-phthaloylacridone radical bound to the —NH— group in 2-position, and R represents a benzene radical that contains at least one trifluoromethyl group.

The new dyestuffs are obtained when 1 mol of cyanuric chloride is condensed with 2 mols of a 2-amino-3:4-phthaloylacridone and 1 mol of an aminotrifluoromethylbenzene in any desired sequence.

Thus, 1 mol of cyanuric chloride can be first condensed with 2 mols of the 2-amino-3:4-phthaloylacridone, and the resulting condensation product of the formula (2)
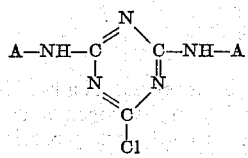

can be further condensed with the aminotrifluoromethylbenzene, or 1 mol of cyanuric chloride can advantageously be condensed first with 1 mol of the aminotrifluoromethylbenzene to form the condensation product of the formula (3)
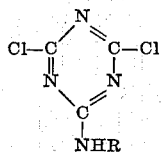

which product can then be condensed with 2 mols of 2-amino-3:4-phthaloylacridone to form the finished dyestuff.

The 2-amino-3:4-phthaloylacridone to be used as starting materials in the process of the invention can contain further substituents, for example, halogen atoms, in the acridone or phthaloyl radical. As examples the unsubstituted 2-amino-3:4-phthaloylacridone, and 2-amino-7-chloro-3:4-phthaloylacridone may be mentioned.

The aminotrifluorobenzene to be used in the process of the invention contain one or two trifluoromethyl groups in the benzene radical, which latter can also be substituted by halogen atoms. Compounds of the formula (4)
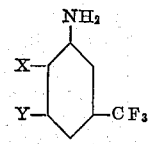

in which X represents chlorine or hydrogen, and Y represents trifluoromethyl or hydrogen are advantageously used. As examples, there may be named 1-amino-3-trifluoromethylbenzene, 1-amino-3:5-di-(trifluoromethyl)-benzene and 1-amino-2-chloro-5-trifluoromethylbenzene.

The reaction is advantageously carried out in a solvent or diluent. For the preparation of the compound of the Formula 3 the condensation is advantageously carried out in an aqueous medium in the cold, in which process it is of advantage to add to the water an inert solvent that is miscible with water, for example, acetone or dioxane, and also an agent capable of binding acid such as sodium carbonate or sodium acetate. The further condensation of the compound of the Formula 3 with the 2-amino-3:4-phthaloylacridone, and the condensation of the cyanuric chloride with the 2-amino-3:4-phthaloylacridone to form the compound of the Formula 2, and the further condensation of this compound with the trifluoromethylaniline require much more rigorous conditions, since the third chlorine atom in the triazine radical is relatively difficult to exchange. Thus, the reaction is advantageously carried out in a high-boiling solvent, for example, in nitrobenzene, ortho-dichlorobenzene, naphthalene or more especially in phenol. The reaction is advantageously carried out at a temperature above 100° C. The exchange of the third halogen atom in the triazine ring can also be facilitated by the addition of small amounts of an aromatic sulfonic acid such as benzene sulfonic acid, para-toluene sulfonic acid or more especially meta-nitrobenzene sulfonic acid.

The products obtained by the process of the invention are suitable for dyeing or printing a very wide variety of materials, especially for the dyeing or printing of fibers made of natural or regenerated cellulose. The dyestuffs of the invention dye cellulose fibers in valuable reddish blue tints, which tints can be shaded substantially purer with red and violet. The dyeings obtained therewith are distinguished by a good fastness to light and good properties of wet fastness and more especially are fast to soda boiling, chlorine and chlorite. The new dyestuffs can also be used as pigments.

Unless otherwise stated, the parts and percentages in the following examples are by weight:

Example 1

A solution of 18.4 parts of cyanuric chloride in 110 parts by volume of acetone was run into 80 parts by volume of water at 10 to 15° C., while stirring well, cyanuric chloride being precipitated in a finely divided form. 19.5 parts of 2-chloro-5-trifluoromethylaniline were then added dropwise and 8.4 parts of sodium bicarbonate were sprinkled in during the course of about 10 minutes to adjust the pH value to 6.8 to 7.1. The reaction mixture was stirred for about 20 minutes at 10 to 20° C. until the cyanuric chloride disappeared. The 2-(2'-chloro - 5' - trifluoromethylphenyl)-amino-4:6-dichloro-1:3:5-triazine so formed was filtered off, washed with water and then dried in vacuo at 60 to 70° C. The yield was 31.4 parts and the product melted at 154 to 155° C. (corrected). When recrystallized from ligroin it melted at 156° C. (corrected).

A mixture of 5.1 parts of 2-amino-3:4-phthaloylacridone, 2.6 parts of the 2-(2'-chloro-5'-trifluoromethylphenyl)-amino-4:6-dichloro-1:3:5-triazine obtained as described in the first paragraph, 4 parts by volume of a 2 to 4% solution of metanitrobenzene sulfonic acid in nitrobenzene and 46 parts by volume of nitrobenzene was stirred for 17 hours at 115 to 120° C. and then for 4 hours at 135 to 140° C. After cooling the reaction mixture, the dyestuff was filtered off, washed with alcohol, and then dried. It dyed cotton from a ruby-red vat blue tints fast to wet processing and light when applied by the usual vat dyeing methods. Yield 6.2 parts. Found: Cl, 3.74%; F, 6.08%. Calculated: Cl, 3.73%; F, 5.99%.

By using in accordance with paragraph 1, an equimolecular proportion of 2-(meta-trifluoromethylphenyl)-amino-4:6-dichloro-1:3:5-triazine or 2-[3':5'-di-(trifluoromethyl)-phenyl]-amino-4:6-dichloro-1:3:5-triazine, instead of 2-(2'-chloro-5'-trifluoromethyl-phenyl)-amino-4:6-dichloro-1:3:5-triazine dyestuffs yielding somewhat greener blue tints were obtained.

The corresponding 2-trifluoromethylphenylamino-4:6-dichlorotriazines can be prepared by the process described in the first paragraph. The products so obtained have the following melting point: 2-(meta-trifluoromethylphenyl)-amino-4:6-dichloro-1:3:5-triazine (M.P. 127 to 128° C. [corrected]); 2 - [3':5' - di - (trifluoromethyl)-phenyl]-amino-4:6-dichloro-1:3:5-triazine (M.P. 129 to 130° C. [corrected]).

Example 2

A mixture of 5.6 parts of 2-amino-7-chloro-3:4-phthaloylacridone, 2.6 parts of 2-(2'-chloro-5'-trifluoromethyl-phenyl)-amino - 4:6 - dichloro-1:3:5-triazine, 0.12 part of meta-nitrobenzene sulfonic acid and 46 parts by volume of nitrobenzene was stirred for 18 hours at 130 to 135° C. and then for 5 hours at 145 to 150° C. The dyestuff, which precipitated in the form of small blue needles, was filtered off at 100° C., washed with alcohol and then dried. Yield: 6:4 parts, found: Cl, 10.8%. The dyestuff dyed cotton from a violet vat blue tints fast to soda boiling and light.

A dyestuff with a somewhat more greenish tint was obtained when, in the process described in the first paragraph of Example 2, the 2-(2'-chloro-5'-trifluoromethylphenyl)-amino-4:6-dichloro-1:3:5-triazine was replaced by an equimolecular proportion of 2-(3'-trifluoromethylphenyl)-amino-4:6-dichloro-1:3:5-triazine.

Example 3

A mixture of 20.4 parts of 2-amino-3:4-phthaloylacridone, 5.4 parts of cyanuric chloride and 300 parts by volume of nitrobenzene were stirred for 2 hours at 110 to 115° C., then for 1 hour at 130 to 135° C. and again for 3 hours at 170 to 180° C. The dyestuff was filtered off at 100° C., washed with alcohol and then dried. It contained 4.26% of chlorine and 12% of nitrogen.

A mixture of 3.85 parts of the dyestuff obtained in the manner described in the first paragraph of Example 3 and 40 parts by volume of meta-trifluoromethylaniline was stirred for 3 hours at 150 to 160° C. and then for 3 hours at 165 to 170° C. The dyestuff was filtered off at 80° C., washed with alcohol and then dried. It exhibited dyeing properties very similar to those of the dyestuff obtained from 2-(meta-trifluoromethylphenyl)-amino-4:6-dichloro-1:3:5-triazine as described in Example 1.

Example 4

A mixture of 6 parts of the product obtained as described in the first paragraph of Example 3, 12 parts of 3:5-di-(trifluoromethyl)-aniline and 75 parts of phenol were stirred for 20 hours at 170 to 180° C. After dilution with 50 parts by volume of nitrobenzene, the dyestuff was filtered off, washed with alcohol and then dried. It contained 11.9% of fluorine. The dyestuff so obtained dyed cotton blue tints possessing an excellent fastness to soda boiling.

By replacing in this example, the 3:5-di-(trifluoromethyl)-aniline by the same amount of metal-trifluoromethylaniline, a dyestuff yielding a more greenish tint was obtained.

What is claimed is:
1. An anthraquinone vat dyestuff of the formula

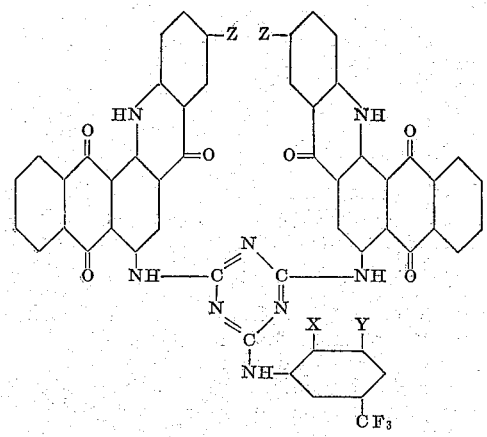

in which X and Z each represents a member selected from the group consisting of hydrogen and chlorine, and Y a member selected from the group consisting of hydrogen and trifluoromethyl.

2. The vat dyestuff of the formula

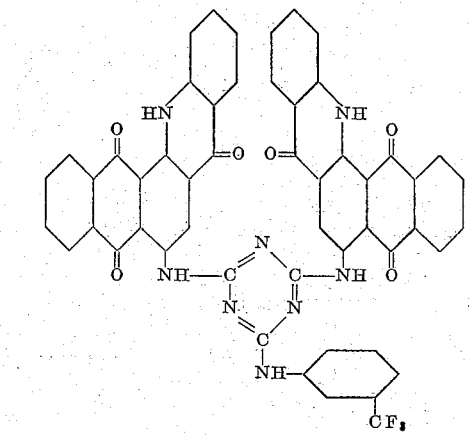

3. The vat dyestuff of the formula
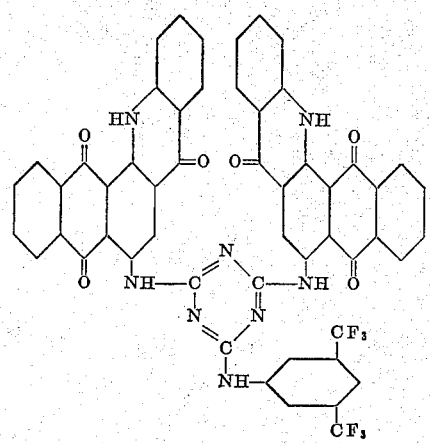
4. The vat dyestuff of the formula
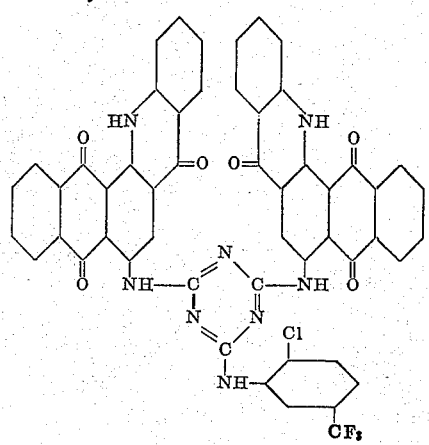
References Cited in the file of this patent
UNITED STATES PATENTS
| | | |
|---|---|---|
| 1,719,792 | Ackermann et al. | July 2, 1929 |
| 2,666,052 | Williams et al. | Jan. 12, 1954 |
| 2,951,842 | Ebel et al. | Sept. 6, 1960 |
OTHER REFERENCES
Venkataraman: "The Chemistry of Synthetic Dyes," Academic Press, Inc., N.Y., 1952, pp. 473, 916, 925 and 1221.